(12) United States Patent
Velde et al.

(10) Patent No.: US 8,700,276 B2
(45) Date of Patent: Apr. 15, 2014

(54) GEAR RATIO EMULATION

(75) Inventors: Todd F. Velde, Dubuque, IA (US);
Nathan J. Horstman, Durango, IA (US)

(73) Assignee: Deere & Company, Moline, IL (US)

( * ) Notice: Subject to any disclaimer, the term of this patent is extended or adjusted under 35 U.S.C. 154(b) by 149 days.

(21) Appl. No.: 13/418,391

(22) Filed: Mar. 13, 2012

(65) Prior Publication Data
US 2013/0245896 A1   Sep. 19, 2013

(51) Int. Cl.
*G06F 17/00* (2006.01)
(52) U.S. Cl.
USPC .......................................................... 701/51
(58) Field of Classification Search
None
See application file for complete search history.

(56) References Cited

U.S. PATENT DOCUMENTS

| | | | |
|---|---|---|---|
| 5,257,193 A | 10/1993 | Kusaka | |
| 5,351,570 A | 10/1994 | Mizunuma | |
| 5,526,261 A | 6/1996 | Kallis | |
| 5,636,120 A | 6/1997 | Yesel | |
| 5,868,214 A | 2/1999 | Workman | |
| 5,954,617 A | 9/1999 | Horgan | |
| 6,248,041 B1 | 6/2001 | Den Besten | |
| 6,487,485 B1 | 11/2002 | Henneken | |
| 6,944,532 B2 | 9/2005 | Bellinger | |
| 7,660,657 B2 | 2/2010 | DeMarco | |
| 2002/0132699 A1 | 9/2002 | Bellinger | |
| 2006/0148615 A1 | 7/2006 | Steen | |
| 2007/0095628 A1* | 5/2007 | Niederbacher | 192/84.6 |
| 2007/0255473 A1* | 11/2007 | Christofl et al. | 701/67 |
| 2008/0039280 A1 | 2/2008 | Petzold | |
| 2009/0118943 A1 | 5/2009 | Heap | |
| 2009/0221392 A1 | 9/2009 | Bruce | |
| 2009/0223215 A1 | 9/2009 | Kelly | |
| 2010/0030438 A1 | 2/2010 | Brattberg | |
| 2010/0056335 A1 | 3/2010 | Ferrier | |
| 2010/0087994 A1 | 4/2010 | Bai | |

FOREIGN PATENT DOCUMENTS

EP   1852635 B1   7/2010

* cited by examiner

*Primary Examiner* — Thomas Tarcza
*Assistant Examiner* — Adam Alharbi
(74) *Attorney, Agent, or Firm* — Stephen F. Rost; Taft Stettinius & Hollister LLP (57) ABSTRACT

The present disclosure provides a method for selectively controlling a work machine according to a current power device load response. The work machine includes a power device having a rotary output, a traction element, a transmission configured to provide a transmission ratio between the power device and traction element, an operator input device having a plurality of positions, and a control system. The method includes receiving selected range and a position of the operator input device, determining a no-load ground speed target as a function of selected range and input device position, and determining a desired ground speed load response as a function of the selected range. A desired transmission ratio is determined as a function of current machine ground speed and machine load. The method also includes determining a command to the power device as a function of a current transmission ratio and no-load ground speed target, determining a desired power device load response as a function of desired transmission ratio and desired ground speed load response, and selectively controlling the machine by switching between the current power device load response and the desired power device load response.

25 Claims, 10 Drawing Sheets

GEAR RATIO EMULATION

FIELD OF THE INVENTION

The present invention relates to emulating a gear ratio of a work machine, and in particular to emulating a gear ratio to achieve a desired machine behavior for optimal performance.

BACKGROUND OF THE INVENTION

Many vehicles utilize drivetrain configurations where ground speed is directly coupled to engine speed, such that in order to obtain very low ground speeds, low engine speeds are required. In situations where engine speed is initially low, an increase in load on the engine can result in an engine stall.

During various grading operations, a motor grader may experience a sudden increase in drawbar load. As a result of the increase in loading, engine speed will decrease and the rimpull will increase. If the operator cannot reduce the load quickly enough, tire slip may occur.

Operating at the same ground speed in a higher gear gives the operator more ground speed feedback and more engine speed feedback, aiding the operator to prevent tire slip. The higher gear also limits the rimpull of the machine, further helping to prevent tire slip. A consequence of running in a higher gear at a lower engine speed is that the engine is less responsive and more susceptible to stalling. Furthermore, emissions reduction controls may reduce the ability of the engine to respond quickly enough to such transient loads and prevent engine stall.

Therefore, it would be desirable to operate the engine at a higher engine speed but in a lower gear while maintaining the same ground speed behavior as the higher gear. In doing so, the machine can behave as if it is operating in a higher gear, shifting automatically to maintain optimal engine speed.

SUMMARY

In an exemplary embodiment of the present disclosure, a work machine includes a power device comprising a rotary output, a range selector input configured to select a range, a traction element, a transmission configured to provide a transmission ratio between the power device and the traction element, where the selected range corresponds to a plurality of transmission ratios, and an operator input device selectively configured to have a plurality of positions. The machine also includes a control system operatively coupled to the power device. The control system comprises a first performance curve and a second performance curve, each of the first and second performance curves expressing torque of the power device as a function of rotational speed of the rotary output of the power device. The first performance curve includes a first no-load speed and the second performance curve includes a second no-load speed which is equal to or greater than the first no-load speed. For a given transmission ratio, a given operator input device position, and given range selector input, the control system is configured to switch the power device between the first performance curve and the second performance curve.

In one aspect, the first performance curve comprises a first governor curve having a first slope and the second performance curve comprises a second governor curve having a second slope, where the second slope is less than the first slope. In another aspect, the first performance curve comprises a first torque curve having a first peak torque and the second performance curve comprises a second torque curve having a second peak torque, where the second peak torque is less than the first peak torque. In a different aspect, the first performance curve comprises a first torque curve having a first peak torque and a first governor curve having a first slope and the second performance curve comprises a second torque curve having a second peak torque and a second governor curve having a second slope, where the second slope is less than the first slope and the second peak torque is less than the first peak torque. In addition, the control system can include a ground speed load response for a given selected range and position of the operator input in which the first and second performance curves both correspond to the ground speed load response.

In another embodiment, a method is provided for selectively controlling the operation of a work machine, the work machine including a power device having a rotary output, a traction element, a transmission configured to provide a transmission ratio between the power device and traction element, an operator input device having a plurality of selectable positions, and a control system. The method includes receiving selected range and a position of the operator input device, determining a no-load ground speed target as a function of selected range and operator input device position, and determining a desired ground speed load response as a function of selected range. A desired transmission ratio is determined as a function of current machine ground speed and machine load. The method also includes determining a power device command as a function of current transmission ratio and the determined no-load ground speed target. A desired power device load response is determined as a function of desired transmission ratio and desired ground speed load response. The method further includes selectively controlling the machine by switching between the current power device load response and the desired power device load response.

In one aspect, the method includes providing a ground speed load response for the selected range and input device position, the ground speed load response being a function of machine load and machine ground speed. In another aspect, the method includes determining a no-load ground speed target comprising identifying the machine ground speed from the ground speed load response corresponding to zero machine load. In a further aspect, the desired ground speed load response is determined by providing a first ground speed load response for the selected range and input device position, the first ground speed load response including a curve with a first slope, and determining a second ground speed load response including a curve with a second slope, the second slope being less than the first slope, where the second ground speed load response has a no-load ground speed target equal to or greater than that of the first ground speed load response.

The method can include determining upshift and downshift shift points in regards to the selected range. The upshift and downshift shift points can be determined as a function of input device position, machine ground speed, power device speed, rate of change of machine ground speed, rate of change of power device speed, or machine load. The method can also comprise shifting between the current transmission ratio and the desired transmission ratio based on the determined upshift and downshift shift points.

Related thereto, the method can include transitioning from a current power device command to a new power device command. Here, the method substantially matches the ratio of the power device speed to machine ground speed according to the desired transmission ratio. In an alternative aspect, the method includes selecting the power device to operate between a first performance curve and a second performance curve, each of the first and second performance curves expressing torque of the power device as a function of rotational speed of the rotary output of the power device, wherein the first performance curve includes a first no-load speed and the second performance curve includes a second no-load speed, the second no-load speed being equal to or greater than the first no-load speed. This can also include providing the first performance curve having a first slope and the second performance curve having a second slope, the first performance curve corresponding to a first range selection and the second performance curve corresponding to a second range selection and achieving two different ground speed load responses for the same transmission ratio.

In addition, the method can comprise providing the first performance curve having a first slope and the second performance curve having a second slope, the first performance curve corresponding to a first transmission ratio and the second performance curve corresponding to a second transmission ratio; and achieving the substantially same ground speed load response for the first and second transmission ratios. The method can further include selecting the power device to operate according to the second performance curve, where the second performance curve has a maximum torque which is less than a maximum torque of the first performance curve, limiting tractive effort to avoid wheel slip, and for a given load, decreasing the power device speed by a greater amount than if the power device were operating according to the first performance curve.

In a different embodiment, a method is provided for determining desired ground speed load response for a work machine having a transmission which provides an arbitrary gear ratio, a power device having a rotary output, an operator input device having a plurality of selectable positions, and a control system including a power device speed control. The method includes receiving a current position of the operator input device and range selection from a range selector, determining a desired no-load ground speed based on the current operator input device position and selected range, and determining a desired ground speed load response based on selected range. The desired no-load ground speed and the desired ground speed load response are independent of the transmission ratio.

In one aspect, the method also includes determining a desired no-load power device speed based on the desired no-load ground speed and the arbitrary transmission ratio, and determining a desired power device load response based on the desired ground speed load response and the arbitrary transmission ratio. In another aspect, the method includes determining a power device command based on the desired no-load power device speed, the desired power device load response, and an estimate of load. Related thereto, the estimate of load can be an estimate of power device torque. Alternatively, the estimate of load can be an estimate of torque applied by one or more devices operatively coupled with the power device.

The method can further include determining desired power device speed as a function of desired ground speed, the arbitrary transmission ratio, and an estimate of load. In addition, the method can include substantially nulling the effect of the power device load on power device speed by adjusting the no-load speed command based on an estimate of the power device load response and the estimate of load.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A work machine, such as a motor grader, can be used in construction and maintenance for creating a flat surface. When paving a road, a motor grader can be used to prepare a base foundation to create a wide flat surface for asphalt to be placed on. A motor grader can include three axles, with an engine and cab disposed above two axles at the rear end of the machine and a third axle disposed at the front end of the machine. A blade is attached to the machine between the front (third) axle and rear axles.

Figure 1:
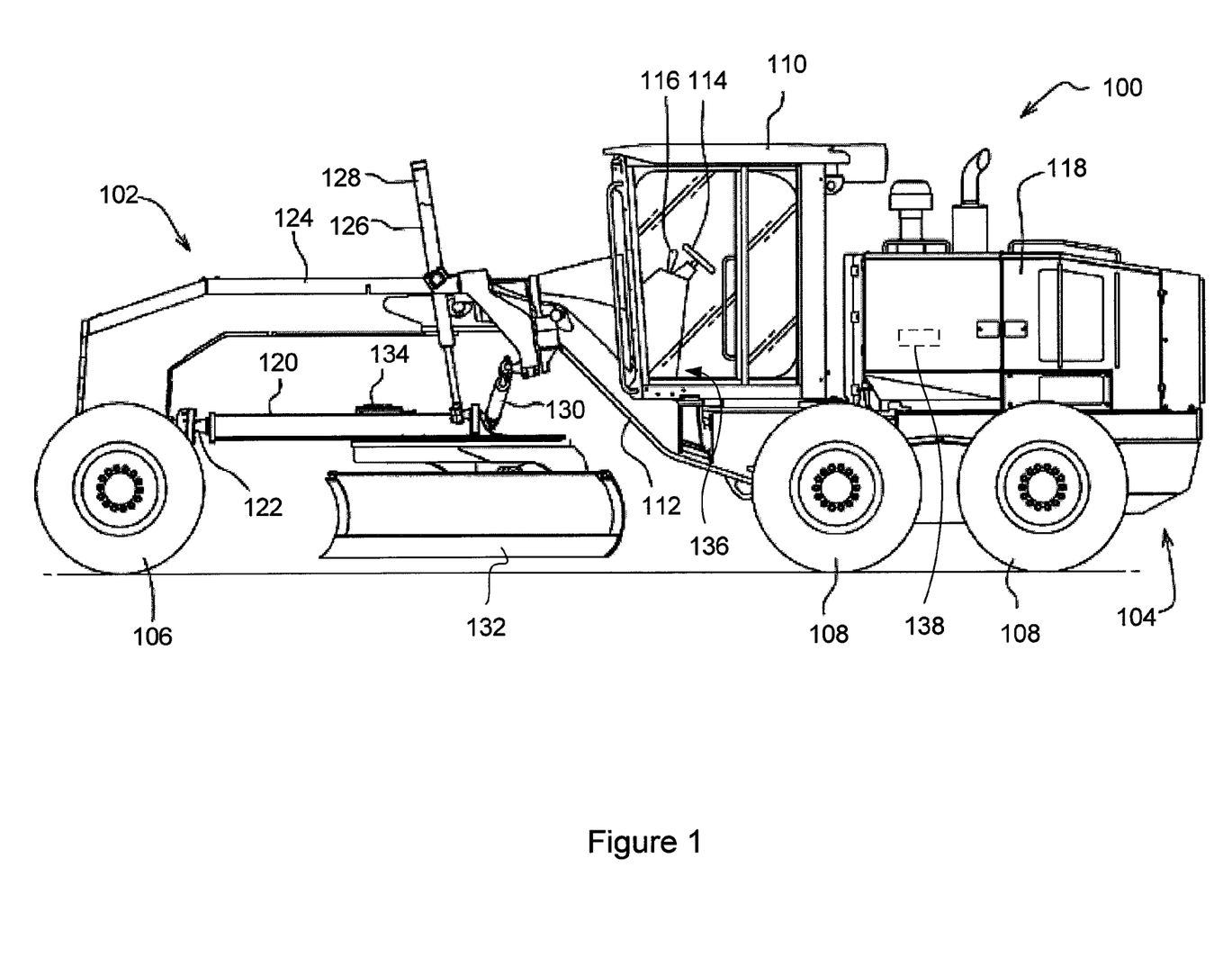
FIG. 1 is a side view of a motor grader.

The present disclosure is not exclusively directed to a motor grader, but rather can extend to other powered machines as well. For exemplary and illustrative purposes, however, the present disclosure will focus on a motor grader. In FIG. 1, a conventional motor grader 100, such as the 772G Motor Grader manufactured and sold by Deere & Company, includes front and rear frames 102 and 104, respectively, with the front frame 102 being supported on a pair of front wheels 106, and with the rear frame 104 being supported on right and left tandem sets of rear wheels 108. An operator cab 110 is mounted on an upwardly and forwardly inclined rear region 112 of the front frame 102 and contains various controls for the motor grader 100 disposed so as to be within the reach of a seated or standing operator, these controls including operator input devices such as a steering wheel 114 and a lever assembly 116. The lever assembly 116 can include a range selector for selecting a desired range. Other controls can be included such as a throttle pedal 136, brake pedal, clutch pedal, etc.

An engine 118 is mounted on the rear frame 104 and supplies power for all driven components of the motor grader 100. The engine 118, for example, can be configured to drive a transmission (not shown), which is coupled for driving the rear wheels 108 at various selected speeds and either in forward or reverse modes. A hydrostatic front wheel assist transmission (not shown) may be selectively engaged to power the front wheels 106.

Mounted to a front location of the front frame 102 is a drawbar 120, having a forward end universally connected to the front frame 102 by a ball and socket arrangement 122 and having opposite right and left rear regions suspended from an elevated central section 124 of the main frame 102 by right and left lift linkage arrangements including right and left extensible and retractable hydraulic actuators 126 and 128, respectively. A side shift linkage arrangement is coupled between the elevated frame section 124 and a rear location of the drawbar 120 and includes an extensible and retractable side swing hydraulic actuator 130. A blade 132 is coupled to the front frame 102 and powered by a variable displacement circle drive motor 134.

The motor grader 100 can include a control system that includes operator controls such as the steering wheel 114 and lever assembly 116. In addition, the motor grader 100 can have its own machine controller 138 which is connected to a machine CAN or datalink. User-input controls, such as the steering wheel 114, lever assembly 116, brake pedal (not shown), and throttle pedal 136, can be in electrical communication with the machine controller 138 either directly or indirectly via the machine CAN or datalink. Similarly, the engine 118 can include an engine control unit (ECU) for controlling the engine and the transmission can include a transmission control unit (TCU) for controlling the transmission. The ECU and TCU can also be connected to the machine CAN or datalink so that each is in electrical communication with the machine controller.

The control system can also include a speed control system for controlling a power device (e.g., engine). The control system can also include a series of maps electronically stored therein, where each map includes performance instructions by which the control system operates under a given set of circumstances. These types of maps are known in the art, and may be configured based on speeds, torques, fuel consumption, throttle percentage, power, temperature, etc. In one example, shift points can be configured into a map based on different ground speeds, torque, and a throttle percentage. The control system can interpolate between values in a map, for example, to determine an output. The output can be configured as an instruction or command to the engine, transmission, service brake, etc.

For purposes of the present disclosure, the terms "gear" and "range" are used throughout. From this point forward, "gear" refers to the state of the transmission, i.e., transmission gear ratio. "Range" refers to a selection made by a machine operator for ground speed behavior, i.e., emulated gear. Thus, the use of the terms "gear" and "range" are used to differentiate between the behavior of the machine in response to operator and load inputs versus the physical state of the transmission. If a machine operator selects third range using the lever assembly 116 or selector, the machine will behave like a conventional machine that is in third gear. However, as described in this disclosure, the control system may select a different gear for operation depending on certain conditions such as ground speed and load. Under the right conditions, the control system may automatically change gears.

If a machine operator selects a range and an "automatic" mode, the control system will change the selected range based on conditions such as ground speed and pedal position, just as the conventional machine in automatic mode would automatically change gears. In this case, the machine operator may desire the behavior of the machine to change based on speed. This would have the advantage of finer speed control at lower speeds. In a direct drive machine, this corresponds to the conventional automatic mode where range and gear are the same. For a hydrostat or series electric with three-speed transmission, for example, the control may emulate an eight-speed automatic but manage the actual transmission ratio optimally as described above.

Figure 2:
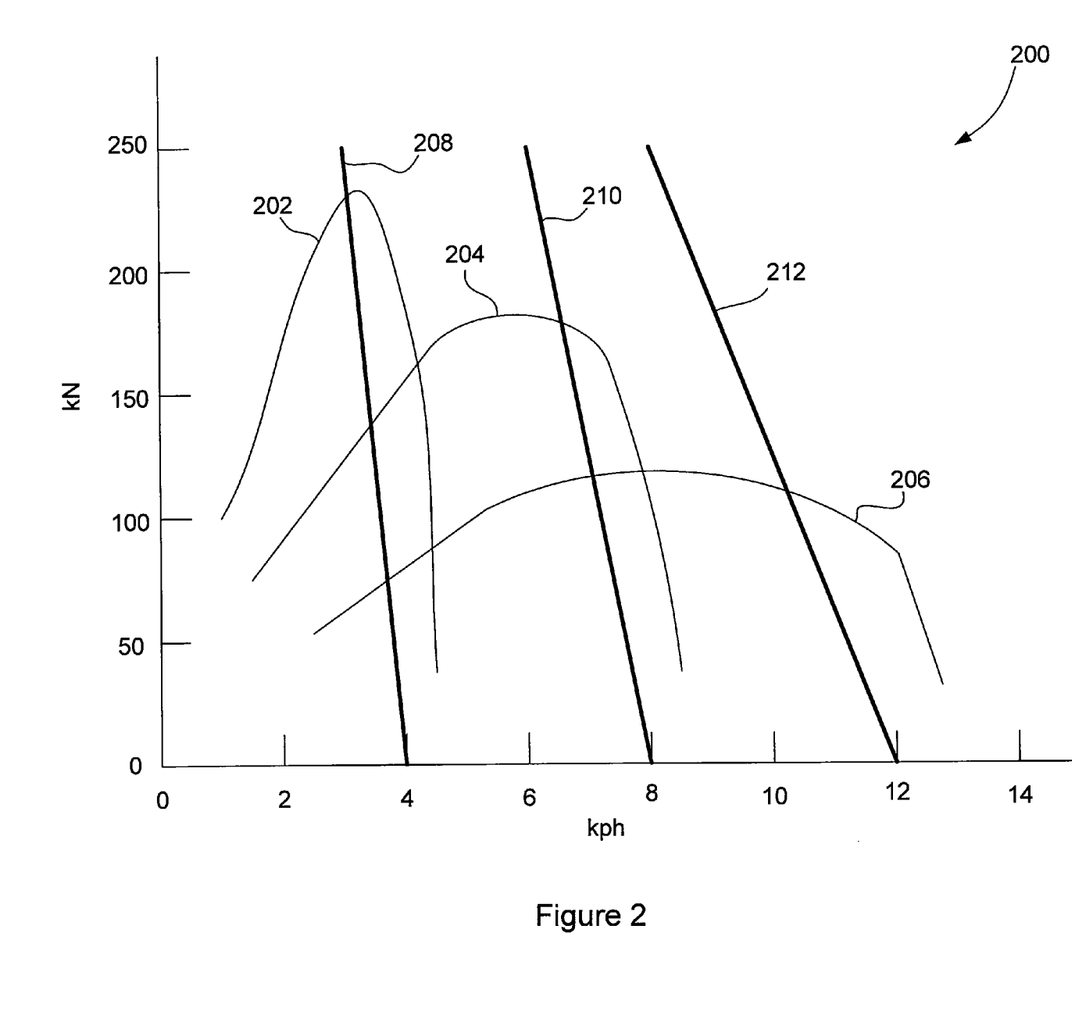
FIG. 2 is a diagram illustrating ground speed droop curves at different gear ratios for a constant engine droop.

Referring to FIG. 2, a chart 200 illustrates a plurality of curves representative of machine ground speed response as a function of different transmission gear ratios. In this embodiment, the machine is shown as having three different gears or ratios. For purposes of the present disclosure, the machine can have a first gear or range, a second gear or range, and a third gear or range. The first gear or range has a gear ratio greater than the gear ratio of the second gear or range. The second gear or range has a gear ratio greater than the third gear or range. The present disclosure, however, is not limited to machines which only have three gear ratios. Instead, the teachings of the present disclosure can apply to a machine having any number of gear ratios, or alternatively, to machines which have hydrostatic transmissions and thus continuously variable ratios. The present disclosure is also applicable to machines which have an infinitely variable transmission.

Figure 4:
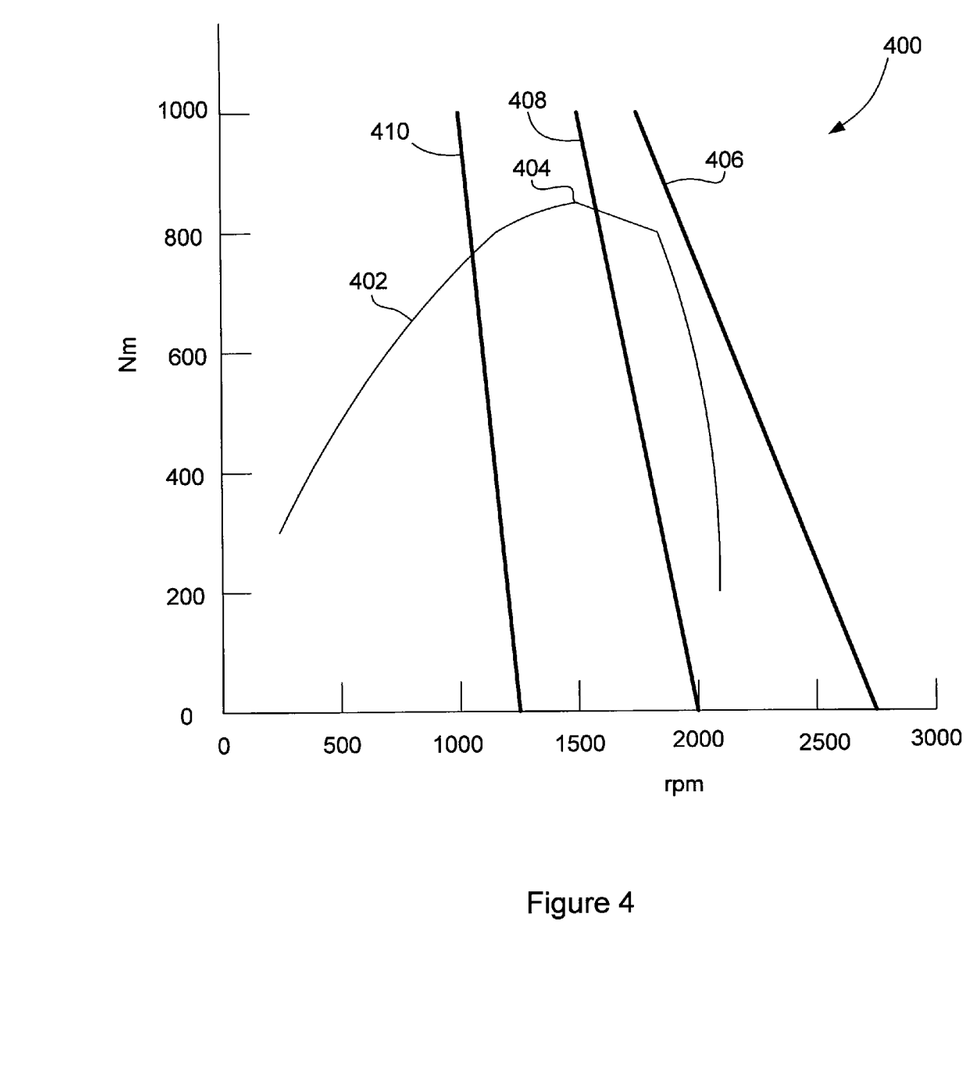
FIG. 4 is a diagram illustrating an exemplary engine speed behavior for the selected range of FIG. 3 at a moderate throttle pedal position.

As previously described, a motor grader operator prefers to operate the motor grader in a condition in which, if the working blade encounters an obstacle such as a rock or heavy dirt, the engine will stall rather than the tires slip. In doing so, the operator may operate the grader in a third gear with throttle at or near an idle state so that if an obstacle is encountered the engine will pull down. In the chart 200, ground speed response in the form of ground speed droop curves (208, 210, and 212) is shown as a function of a constant engine droop. Engine droop, or engine governor, is a closed loop control on engine speed that defines a curve by which engine speed follows. FIG. 4, for example, illustrates different engine droop curves as a function of engine speed (RPM) and torque (N-m). The throttle pedal position (i.e., accelerator pedal position) can map or correspond to a non-load machine speed target, but the engine governor will allow the engine speed to droop as a function of torque or load. In other words, engine speed is controlled with an increase or decrease in load or torque.

The ground speed response to an increase in load is illustrated in chart 200. The chart 200 depicts a first ground speed curve 208 for a machine operating in first gear, a second ground speed curve 210 corresponding to second gear, and a third ground speed curve 212 corresponding to third gear. The chart 200 also includes a first rimpull curve 202 for first gear, a second rimpull curve 204 for second gear, and a third rimpull curve 206 for third gear. Again, this embodiment only illustrates three gears but it is understood that the machine may include additional gears. As such, if the machine had eight gears, the chart 200 would have eight different rimpull curves and eight different ground speed droop or governor curves for each gear.

As shown in FIG. 2, the difference between the first ground speed curve 202, second ground speed curve 204, and third ground speed curve 206 is the slope of each. The slope of the first ground speed curve 202, for example, is 250 kN/kph. The slope of the second ground speed curve 204 is 125 kN/kph, whereas the slope of the third ground speed curve 206 is 62.5 kN/kph. In other words, the machine ground speed curve in first gear is much steeper than in second and third gears. Thus, a machine operator may prefer to operate in third gear because if an obstacle is encountered during a grading operation, for example, an increase in load will result in a much greater reduction in machine speed than in first gear. With a greater reduction in machine speed, the operator will notice the engine pulling down and has time to react and adjust the machine speed. As another way to look at this, if the machine operator is operating in third range according to the third ground speed curve 212, a load of 250 kN will cause the machine speed to decrease by 4 kph. In first gear, the same load of 250 kN will cause the machine speed to only decrease by 1 kph. Thus, it will be more difficult to feel the engine pull down in first gear compared to third gear.

Figure 3:
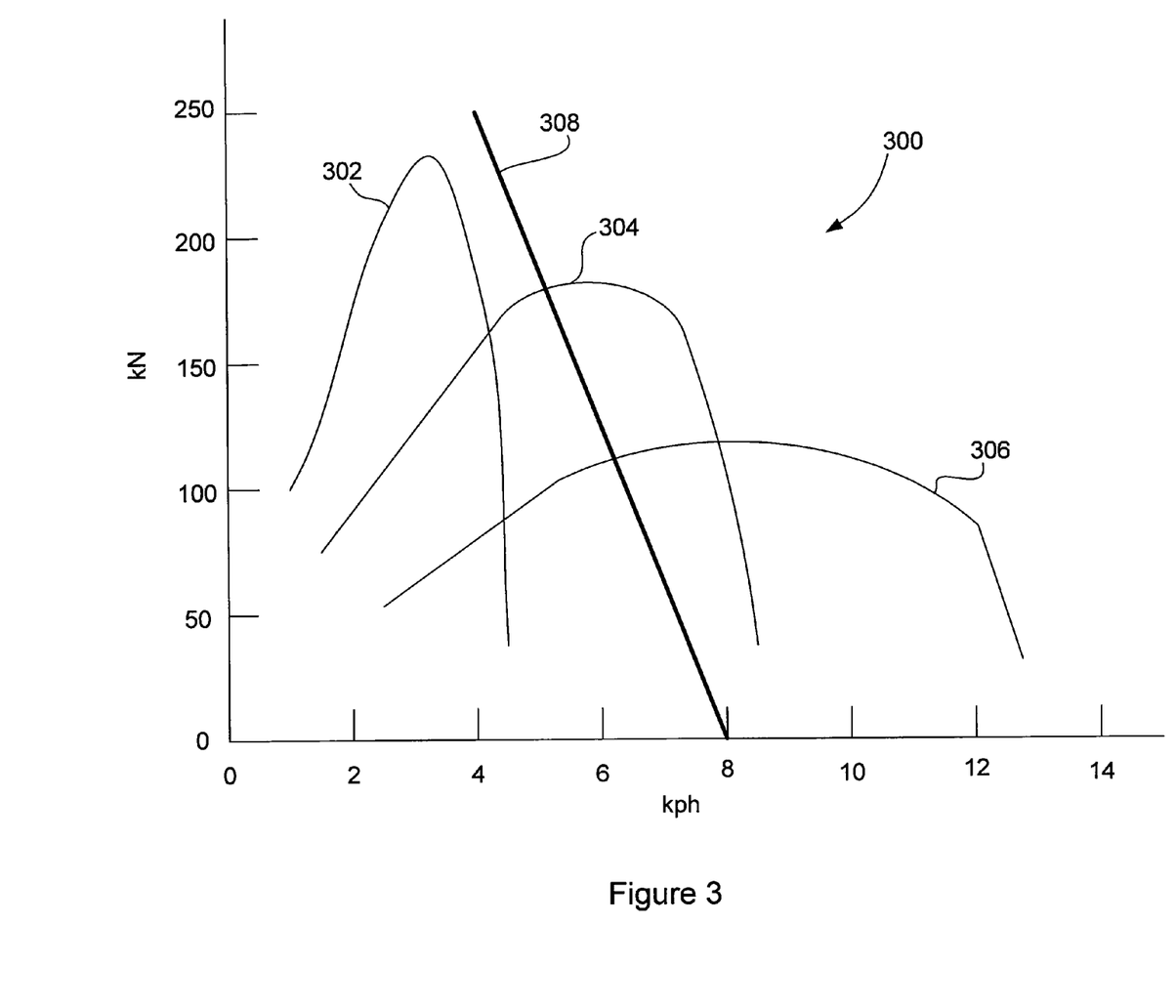
FIG. 3 is a diagram illustrating an exemplary desired machine ground speed behavior for a selected range at a moderate throttle pedal position.

Since an engine may perform better at a higher engine speed, it can be desirable to control the engine in a lower gear but at a higher engine speed (or greater throttle pedal position). An advantage of doing so is being able to control the machine behavior at a higher gear, which has the benefits described above related to chart 200, and operating at a higher engine speed to achieve the benefits of the corresponding engine droop curve. Referring to FIGS. 3 and 4, the benefits of this control system will be described. In FIG. 3, a chart 300 illustrates a single ground speed droop curve 308. A first rimpull curve 302, a second rimpull curve 304, and a third rimpull curve 306 are also shown. The first rimpull curve 302 represents the machine operating in a first gear (high gear ratio). The second rimpull curve 304 represents the machine operating in a second gear (intermediate gear ratio). The third rimpull curve 306 represents the machine operating in a third gear (low gear ratio). While this embodiment only shows three different rimpull curves, it is to be understood that the present disclosure is broad enough to encompass a powered machine with any combination of gear ratios, including continuously variable and infinitely variable ratios.

In FIG. 3, the ground speed droop curve 308 is representative of an exemplary machine operating in third range at a moderate throttle pedal position. The slope of curve 308 is 62.5 kN/kph, which is the same as the slope of curve 212 in FIG. 2. Similar to the embodiment of FIG. 2, and although not shown, it is understood that the ground speed droop curves for first range and second range would have steeper slopes than that of curve 308.

Referring to FIG. 4, a chart 400 is provided which illustrates different engine droop or governor curves corresponding to the ground speed droop curve 308 of FIG. 3. In particular, each engine droop curve is provided for a given gear. For instance, a first engine droop curve 406 corresponds to a first gear, a second engine droop curve 408 corresponds to a second gear, and a third engine droop curve 410 corresponds to a third gear. The chart 400 also shows an engine torque curve 402 for a given engine having a peak torque 404.

The slope of each engine droop curve, or also referred to as an engine governor curve, differs depending on the gear. For example, the first droop curve 406 has a slope of 1 Nm/rpm. The second droop curve 408 has a slope of 2 Nm/rpm, whereas the third droop curve 410 has a slope of 4 Nm/rpm. As shown, when a machine encounters an increased load (i.e., torque), the engine speed decreases more for a given load in first gear than in either second or third gear. In this embodiment, if the machine suddenly encounters a 1000 Nm torque, the engine speed will be controlled in third gear to decrease by 250 rpm, in second gear to decrease by 500 rpm, and in first gear to decrease by 1000 rpm. Since machine operators operating a motor grader desire to feel the engine pull down when an obstacle is encountered, it can be more desirable to operate in a lower gear because it is easier to feel the engine pull down and avoid engine stall.

One way to achieve this is to provide a control system that automatically controls the machine to operate in a lower gear but select a different engine droop curve that has more slope while maintaining the same ground speed behavior as if in a higher gear. To do so, suppose a work machine is operating in third gear at idle. In this condition, there is no throttle and no load on the engine. Referring to the ground speed behavior curve 308 in FIG. 3, the no-load machine speed target is 8 kph. The operator may prefer this gear because the slope of the ground speed droop curve 308 is sloped so that if an obstacle is encountered the operator will feel the engine pull down and have sufficient time to react and adjust the machine controls (e.g., throttle pedal position). Referring now to FIG. 4, the no-load, idle condition for the machine to operate at 8 kph in third gear corresponds to an engine speed of 1250 RPM (i.e., the no-load engine speed corresponding to the third engine droop curve 410). In the present disclosure, it can be desirable for the control system to select an engine droop curve for a lower gear. In FIG. 4, for example, it is possible the engine may be commanded to perform based on the second engine droop curve 408 or first engine droop curve 406. If the second engine droop curve 408 is selected, the control system will command a throttle pedal position corresponding to 2000 rpm. If, however, the first droop curve 406 is selected, the control system will command a throttle pedal position corresponding to 2750 rpm (which, in FIG. 4, will not happen since the engine droop curve 406 is outside the torque limits of the engine). These engine speed values are only intended to serve as examples of how the control system might operate and select different engine droop curves. Depending on the engine, it is possible and perhaps likely the engine speed values at no-load will be closer in value for each of the different droop curves.

The control system is also capable of adjusting to operator inputs. For instance, if the operator presses on the throttle pedal, the control system will monitor whether the transmission can continue in first gear or if it must upshift to second gear. For instance, it may become more optimal for the transmission to operate in a higher gear and therefore an upshift becomes necessary. Alternatively, the transmission output speed may reach a level at which the transmission can no longer operate in first gear, and therefore the transmission will upshift into second gear. The transition between gears can be done smoothly and seamlessly so the operator gets the same ground speed behavior and feel as the control system controls throttle pedal position and engine speed as if the transmission was in third gear the entire time.

If the control system shifts the transmission to second gear, the control system will also command the engine to operate according to the second engine droop curve 408. In the event the operator downshifts from second gear to first gear, the control system will command the engine to perform according to the engine droop curve 406 for first gear. The control system therefore can request or command the engine to operate according to different droop or governor curves and at the same time control transmission shifting. As such, a machine control system can control the machine as if in a higher gear regardless of throttle pedal position, but being able to do so while controlling the engine based on different performance curves and controlling transmission shifting as necessary.

The control system may control the machine based on a performance map for a selected gear and throttle pedal position. Based on these inputs, the control system can select a desired engine droop curve. The map may also include or be defined as a function of ground speed so that ground speed behavior is considered or maintained. The control system will consider the ground speed map, determine a desired gear to select, and determine the throttle pedal position (i.e., engine speed) to command to achieve a certain ground speed.

Figure 5:
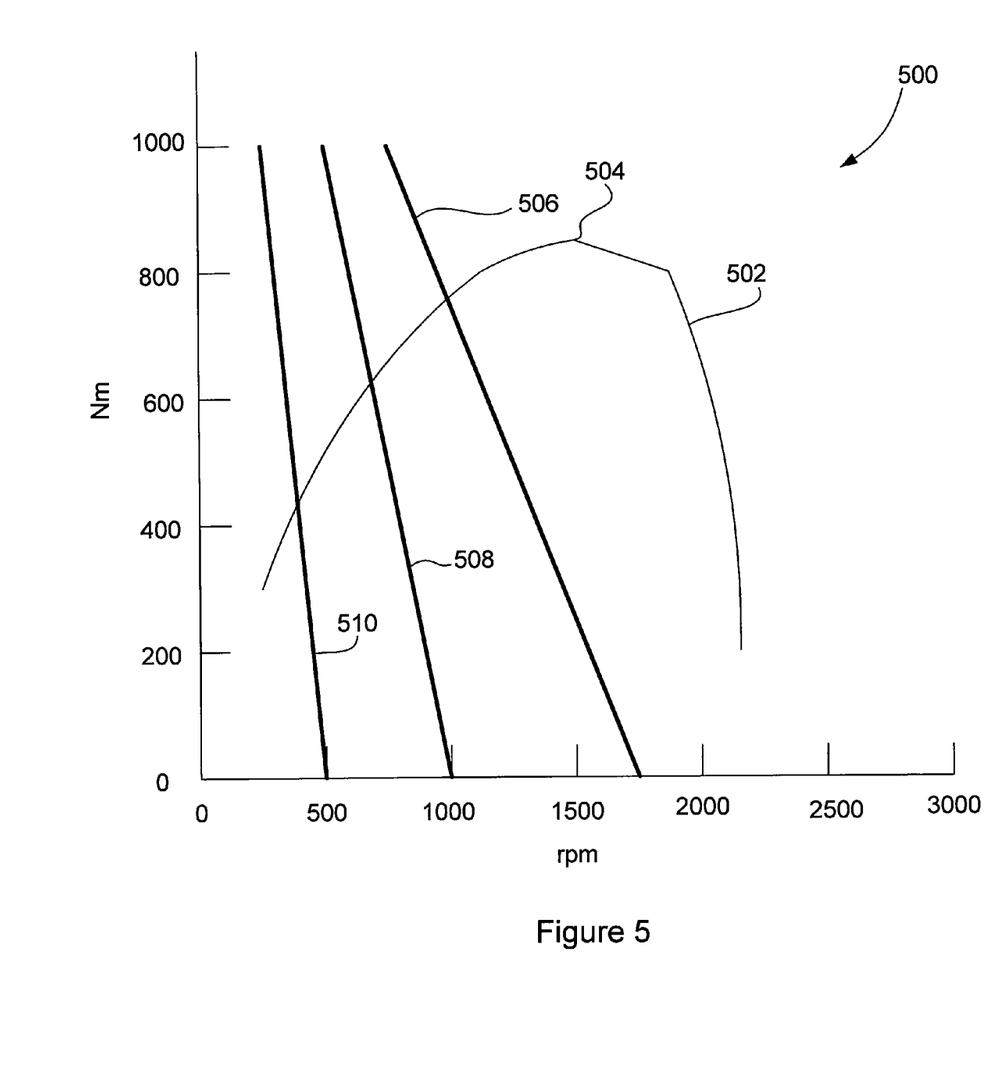
FIG. 5 is a diagram illustrating an exemplary engine speed behavior for a selected range at a low throttle pedal position.

Referring to FIG. 5, a chart 500 of engine speed behavior is shown for a machine operating at a throttle pedal position less than what is shown in FIG. 4. Here, the machine can be operating in third gear, which is shown by engine speed droop curve 510. The chart 500 includes a torque curve 502 having a peak torque 504. In addition to the engine speed droop curve 510 for third range, the chart 500 also includes a second range engine speed droop curve 508 and first range engine speed droop curve 506. As shown, at a lower torque, the machine operates more optimally in third gear. However, as the load increases, the control system would eventually downshift the transmission to second gear and follow the droop curve 508. In this embodiment, the first engine speed droop curve is outside the torque curve limit and thus is not obtainable.

Figure 6:
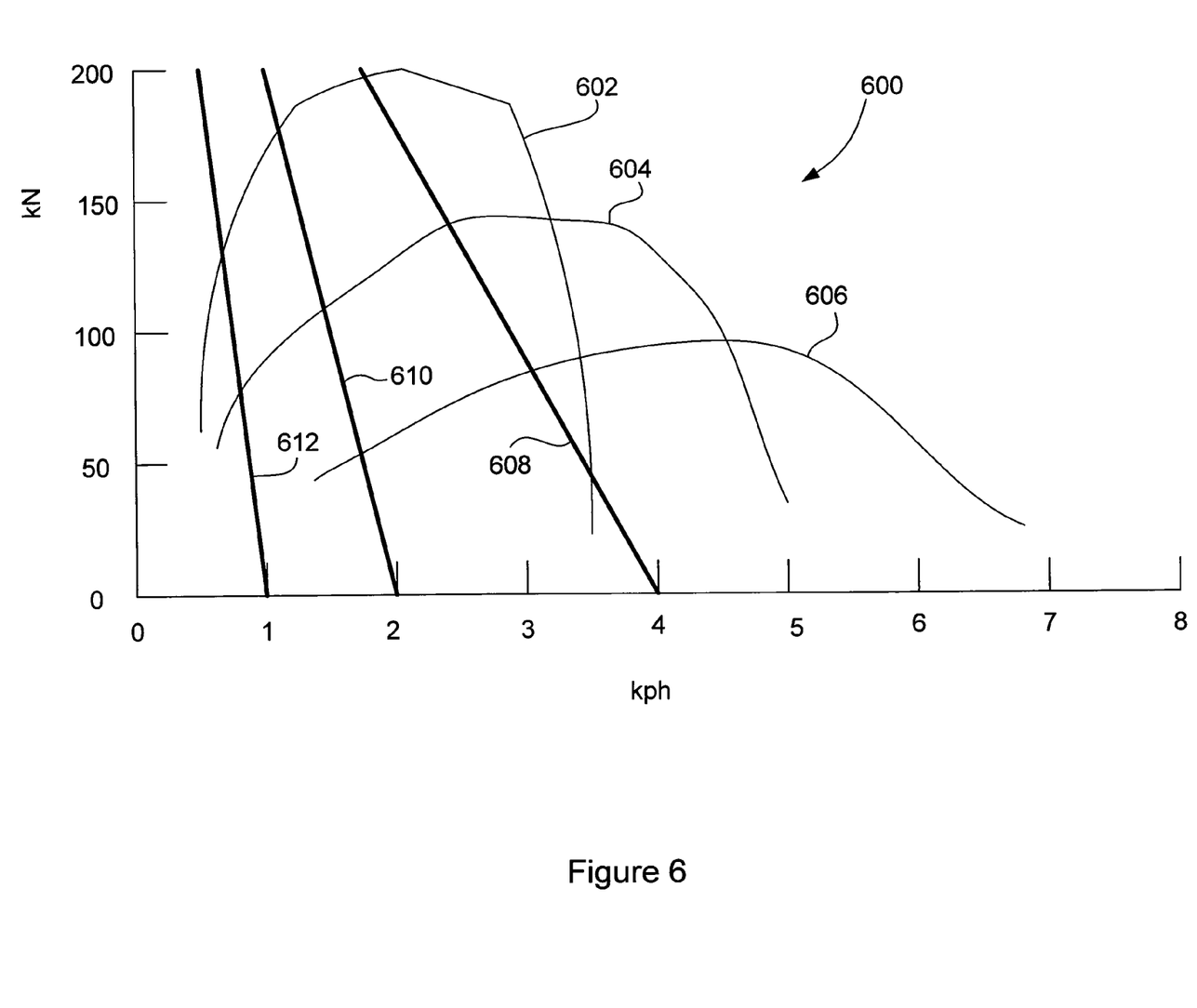
FIG. 6 is a diagram illustrating exemplary ground speed droop curves for various ranges at a low throttle pedal position.
Figure 7:
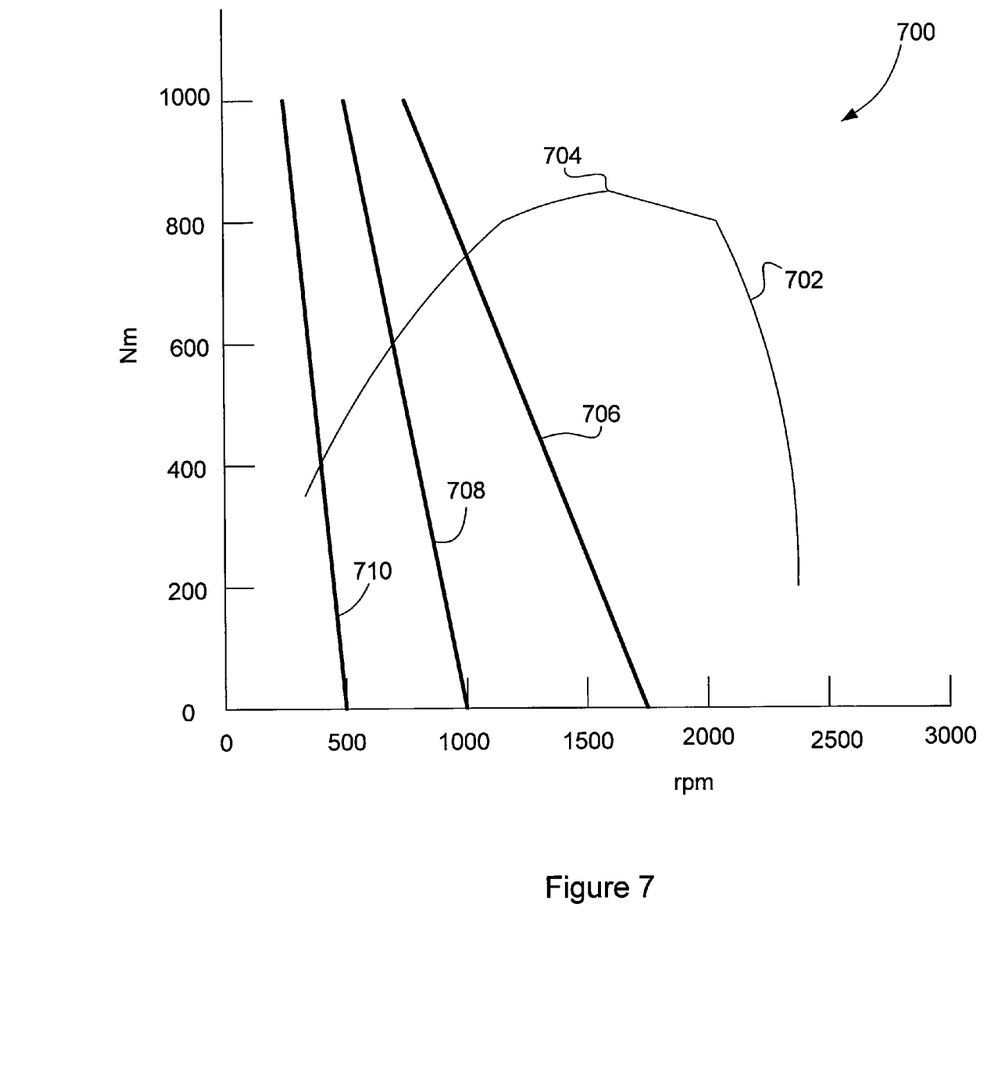
FIG. 7 is a diagram illustrating engine droop curves for selected first gear.

Referring to FIGS. 6 and 7, a different embodiment is presented in which the machine is operating in first gear. In FIG. 6, a chart 600 shows a first rimpull curve 602 for first gear, a second rimpull curve 604 for second gear, and a third rimpull curve 606 for third gear. A first ground speed droop curve 608 is shown for third range, a second ground speed droop curve 610 for second range, and a third ground speed droop curve 612 for first range. With the operator selecting first range, the control system operates according to the third ground speed droop curve 612. In this example, the no-load ground speed is 1 kph.

In FIG. 7, engine speed droop curves are shown corresponding to first range, second range, and third range. With first range being selected, the chart 700 in FIG. 7 shows an engine droop curve 710 corresponding to first gear. The chart 700 shows an engine torque curve 702 having a peak torque 704 at approximately 1500 rpm. A second engine speed droop curve 708 is shown corresponding to second range and a third engine speed droop curve 706 is shown corresponding to third range.

In the present embodiment in which the machine operator has selected first range with a no-load ground speed of 1 kph, the corresponding engine speed for first gear in this condition would be approximately 500 rpm as shown in FIG. 7. If, however, the desired range is actually third range due to the slope of the engine speed droop curve 706, the control system can increase the throttle pedal position and engine speed to approximately 1750 rpm. If the control system selects a different gear, i.e., second gear, the control system will include new engine speed droop curves which correspond with a selected second gear for each range. If, while in selected second range the machine operator downshifts back to first range, the engine speed droop curves shown in FIG. 7 will be applicable again.

Figure 8:
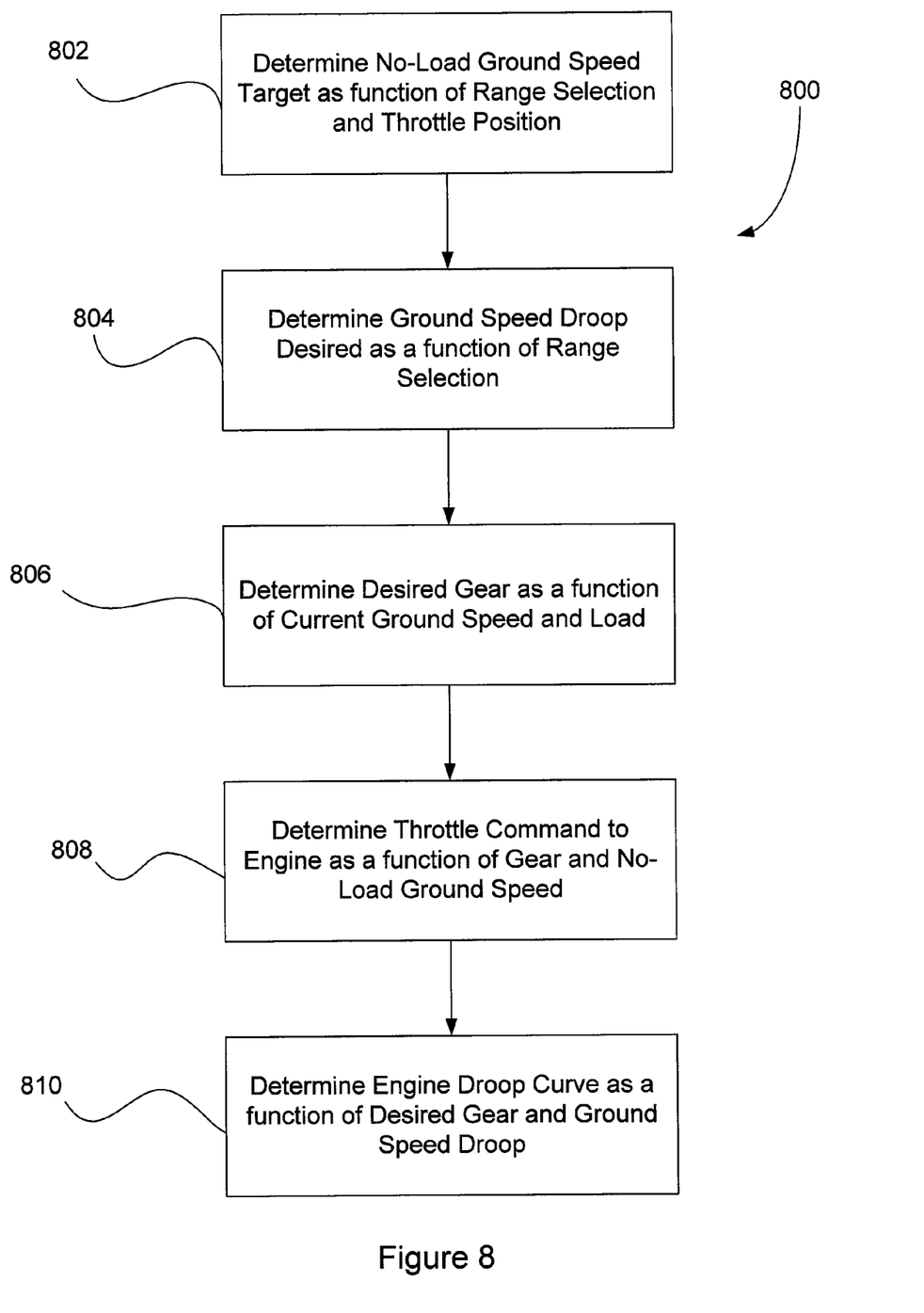
FIG. 8 is a flow diagram of a method for automatic gear emulation.

In FIG. 8, an exemplary embodiment of a control method 800 for controlling a power device such as an engine or electric motor from a first performance curve to a second performance curve. The first and second performance curves can each be expressed in terms of torque of the power device as a function of rotational speed of the rotary output of the power device. The first performance curve can include a first droop or governor curve having a defined slope and the second performance curve can include a second droop or governor curve having a defined slope. The slope of the second governor curve is less than the slope of the first governor curve. In addition, the first performance curve can include a first torque curve and the second performance curve can include a second torque curve. Both torque curves can have a peak torque, where the peak torque of the second torque curve is less than the peak torque of the first torque curve.

For exemplary purposes, the control method 800 will be described in combination with the curves illustrated in charts 300, 400 shown in FIGS. 3 and 4, respectively. The control method 800 can include a plurality of steps, some of which may not be shown in FIG. 8. Alternatively, other aspects of the control method 800 may not require one or more of the steps show in FIG. 8 to be performed. As such, the control method 800 represents only one way of several for achieving the advantages of the present disclosure.

During machine operation, the operator can select a range by controlling a shift selector 116. The operator can also move the throttle pedal 136 to achieve a desired machine speed in that selected range. For purposes of this discussion, suppose the operator has selected third range. The machine controller is in electrical communication with the selector 116 and throttle pedal 136 so as to be able to perform the control method 800. As shown in FIG. 3, the ground speed droop curve 308 for third gear is shown as a function of load (kN) and machine speed (kph). In block 802, the controller can determine a no-load ground speed target as a function of the selected range and throttle position. In FIG. 3, the ground speed droop curve 308 is shown at a moderate throttle pedal position. Here, the no-load ground speed target can be determined at the point in which the droop curve 308 is at a load of 0 kN, i.e., 8 kph.

Once the no-load ground speed target is determined in block 802, the controller can determine the desired ground speed droop as a function of range selection in block 804. Here, the slope of the ground speed droop curve is being determined with the no-load ground speed target (i.e., 8 kph) being a point on the curve. As already described, the ground speed droop curve determines how a machine will respond to an increase in load, and in particular, as the load increases how quickly the machine ground speed will decrease. In other words, the desired ground speed droop curve determines the desired ground speed or drawbar behavior of the machine.

As previously described, the controller can determine which gear to select to achieve this behavior. The slope of each machine speed droop curve is different depending on the range. In first range, the ground speed droop curve can be steep, whereas in second range the slope is less steep than in first range. In third range, the slope of the ground speed droop curve is even less steep than the droop curve in second range. In FIG. 3, for example, the slope of the ground speed droop curve in third range is 62.5 kN/kph. The slope of the ground speed droop curve is established based on the no-load ground speed target and slope.

The control method 800 can proceed to block 806 where a desired gear is determined as a function of current ground speed and load. The desired gear may be determined for optimal engine performance, optimal drivetrain performance, efficiency, etc. Here, the desired gear can be different than the selected range so that optimal engine and machine performance can be achieved. As those skilled in the art understand, an engine will have an optimal region for performing based on factors such as fuel economy, engine transient response, and performance. In view of ground speed, the rimpull curve for a selected gear can assist with determining what gear can handle a given speed and load. The machine controller may include programmed logic to determine what the desired gear should be based on efficiency, optimization, and to avoid gear hunting. The logic, for instance, may determine upshift and downshift points based on ground speed and load, engine speed and load, or operator inputs such as selected range and throttle pedal position. These shift points may be arranged in a map which is used by the controller to control shifting to a desired gear. It may be desirable to include built-in hysteresis to avoid gear hunting and provide stable behavior.

Once the controller determines the desired gear to shift to in block 806, the controller can determine throttle command to the engine (or power device) as a function of current gear and the no-load ground speed in block 808. This throttle command can be communicated by the machine controller to the ECU. The commanded throttle pedal position can be achieved to desirably match engine speed to ground speed and maintain substantially constant torque when shifting from the current selected range to the desired gear. The shifting can take place automatically and the machine transitions smoothly to a new throttle position.

The control method 800 then proceeds to block 810 where the engine droop or governor curve is determined as a function of desired gear and ground speed droop. In FIG. 4, if the current selected range is third range but the desired gear is second gear, the controller can command a new throttle pedal position to shift from 1250 rpm at no load to 2000 rpm at no load. In doing so, the engine or power device performs according to the governor curve 408 for second gear. The engine governor or droop curves in FIG. 4 are only provided as an example and are not intended to limit the scope of the present disclosure.

The control method 800 of FIG. 8 is a way to allow a machine operator to choose a ground speed droop behavior and operating speed range with the range selector, and the no-load ground speed target within that range with the throttle pedal, while allowing for one of a plurality of discrete transmission ratios. However, the present disclosure is not limited to control schemes operating with discrete ratios. In some embodiments, it is desirable to provide a similar control scheme for a transmission with arbitrary ratios. This can be a hydrostatic transmission with continuously variable gear ratios. It may also be a machine which includes an infinitely variable transmission. In either case, the machine has a transmission without a set number of discrete transmission ratios.

Figure 9:
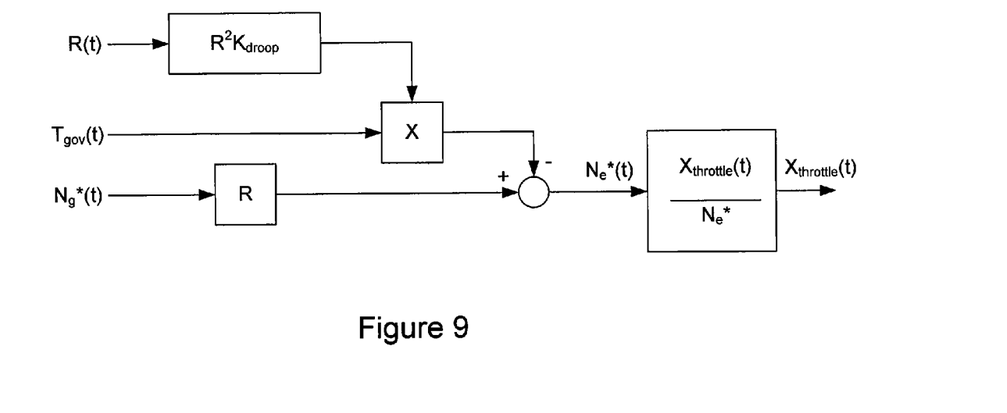
FIG. 9 is a control schematic for ground speed droop control as a function of transmission ratio.

To achieve a control scheme for a transmission with arbitrary gear ratios, the droop control is performed at the transmission control unit (TCU) level. Referring to FIG. 9, one aspect of a control schematic is provided for ground speed droop control as a function of transmission ratio, R. The transmission ratio, R, is shown as a function of time in the event the ratio is arbitrary. The TCU or machine controller can interpret throttle pedal position and range selection to determine a desired no-load ground speed, $N_g^*$. The ECU, TCU or machine controller can determine the desired engine speed $N_e$ based on the desired no-load ground speed $N_g^*$, the engine load $T_{gov}$, the transmission ratio R, and the desired ground speed droop, $K_{droop}$. These determinations can be similar to that of the control method 800 described above.

The desired ground speed droop, $K_{droop}$, is given as a ratio of ground speed/rimpull. There is a corresponding desired transmission output speed droop, which would have a nominally, fixed relationship with ground speed and rimpull. The ground speed and rimpull are related to the transmission output speed and torque by the tire radius and final drive ratio. The desired transmission output speed droop, $K_{droop}$ describes a desired relationship between transmission output speed and torque as follows:

$$K_{droop} = N_g/T_g$$

Here, the transmission output speed $N_g$ and the transmission output torque $T_g$ are related to engine speed $N_e$ and engine torque $T_e$ as follows:

$$N_e = RN_g$$

$$T_g = RT_e$$

In order to determine the desired engine speed (or the desired engine speed droop) to communicate to the engine controller, the desired transmission output droop can be converted from units of (transmission output speed in rpm/transmission output torque in Nm) to units of (engine speed in rpm/engine torque in Nm). In other words, the relationship $K_{droop@engine} = N_e/T_e$ can be found that corresponds to the desired transmission output behavior $K_{droop} = N_g/T_g$ for a given transmission ratio R. Given the definitions above, $$K_{droop@engine} = N_e/T_e = RN_g/T_g/R = R^2 N_g/T_g = R^2 K_{droop}$$

The desired engine speed can be determined as follows:

$$N^*_e = N_{eNL} + K_{droop@engine} T_e = N_{eNL} + R^2 K_{droop} T_e$$

Figure 10:
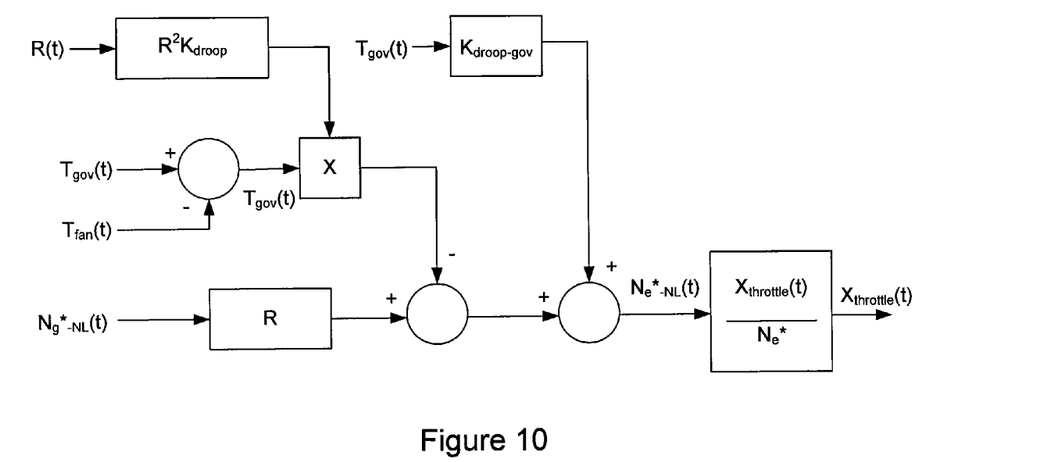
FIG. 10 is another control schematic for ground speed droop control as a function of transmission ratio.

Also, since the droop control is inclusive of engine droop control, the desired ground speed droop $K_{droop}$ can be adjusted so that the total desired droop is achieved. Droop that is built into the engine controller can be removed or decoupled from engine droop and is shown in FIG. 10 as $K_{droop\text{-}gov}$.

Engine load, $T_{gov}$, can also be adjusted to account for loads which are undesirable to a droop response. A control schematic for ground speed droop control as a function of transmission ratio R with engine governor droop and fan torque decoupled is shown in FIG. 10. Here, fan load, $T_g(t)$, is decoupled from the control scheme. In particular, the governor droop control is decoupled since it is based on the total engine load, $T_{gov}$. The throttle command, $X_{throttle}$, can then be determined from the desired engine speed using the engine's throttle map.

Figure 11:
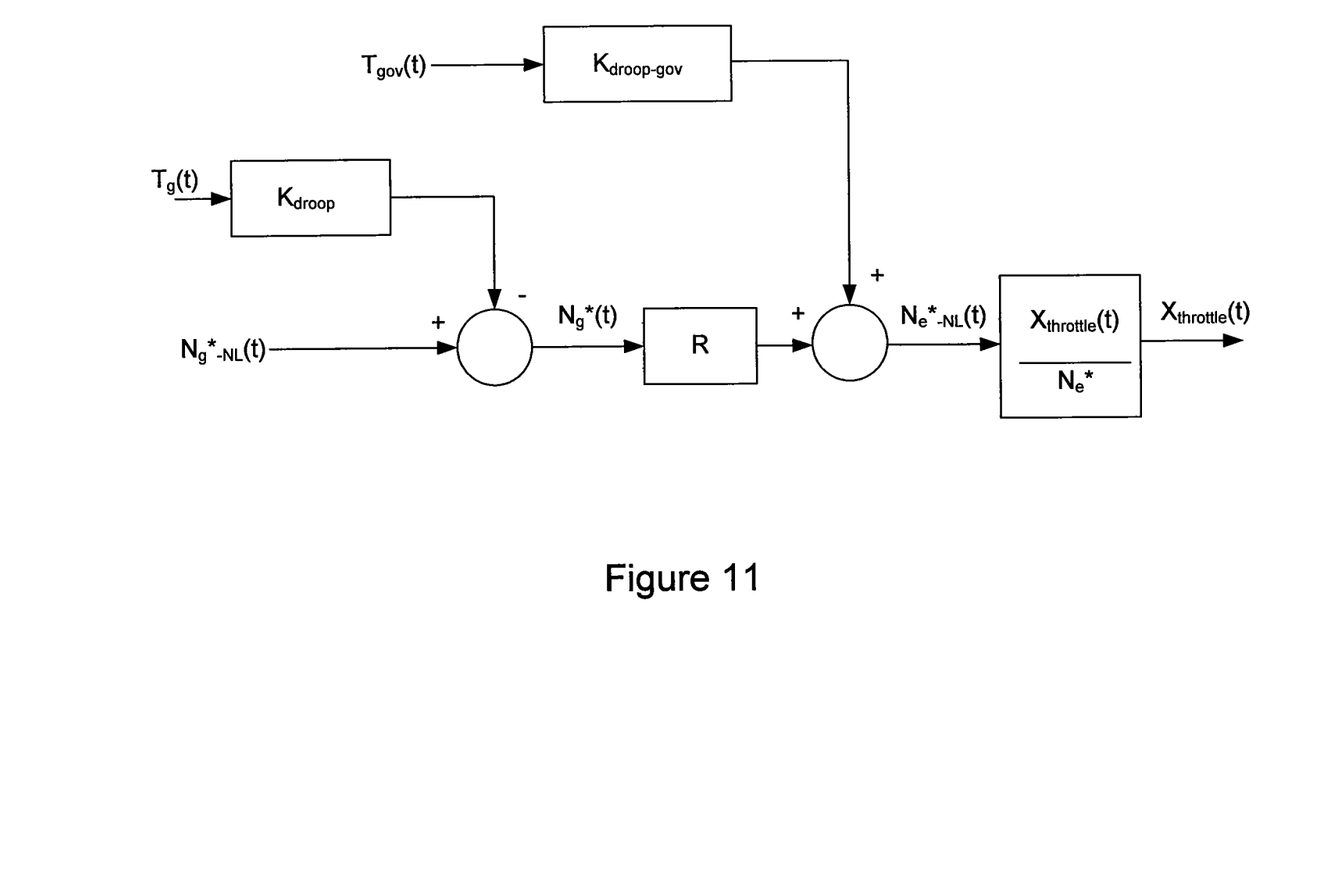
FIG. 11 is a different control schematic for ground speed droop control as a function of transmission ratio.

In a related aspect shown in FIG. 11, a control schematic is shown for ground speed droop control as a function of transmission ratio with the engine governor droop decoupled. Ground speed droop control can also be determined as a function of estimated ground load. Here, if it is desired to determine ground speed droop in response to hydraulic loads, the control schematic can include a hydraulic load droop as shown in FIG. 11. The engine speed change in response to hydraulic load does not need to be the same as the response to drivetrain load.

The desired no-load ground speed, $N_{g\text{-}NL}$, is a function of operator inputs, namely, throttle pedal position and range selection. Drivetrain load, $T_g$, can be estimated, for example, by using engine load $T_{gov}$ less fan and other estimated engine loads. Other means of doing so would be to use hydrostatic pump pressures and displacements or by using an observer. The desired ground speed $N_g$ can be converted to desired engine speed $N_e$ using the transmission ratio R. The Desired no-load engine speed $N_{e\text{-}NL}$ can then be determined by adding the expected engine droop.

Although the embodiments of FIGS. 9-11 are described as being performed by the TCU or machine controller, in an alternative embodiment, the control scheme of the present disclosure can also be performed in the engine controller. In doing so, the transmission ratio or the droop gain can be provided as an input to the governor. This may be desirable due to possible delay in communication between the controllers.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A work machine, comprising:
a power device comprising a rotary output,
a range selector input configured to select a range,
a traction element,
a transmission configured to provide a transmission ratio between the power device and the traction element, where the selected range corresponds to a plurality of transmission ratios,
an operator input device selectively configured to have a plurality of positions, and
a control system operatively coupled to the power device, the control system comprising a first performance curve and a second performance curve, each of the first and second performance curves expressing torque of the power device as a function of rotational speed of the rotary output of the power device;
wherein, the first performance curve includes a first no-load speed and the second performance curve includes a second no-load speed which is equal to or greater than the first no-load speed;
further wherein, for a given transmission ratio, a given operator input device position, and given range selector input, the control system is configured to switch the power device between the first performance curve and the second performance curve.

2. The work machine of claim 1, wherein:
the first performance curve comprises a first governor curve having a first slope; and
the second performance curve comprises a second governor curve having a second slope, where the second slope is less than the first slope.

3. The work machine of claim 1, wherein:
the first performance curve comprises a first torque curve having a first peak torque; and
the second performance curve comprises a second torque curve having a second peak torque, where the second peak torque is less than the first peak torque.

4. The work machine of claim 1, wherein:
the first performance curve comprises a first torque curve having a first peak torque and a first governor curve having a first slope; and
the second performance curve comprises a second torque curve having a second peak torque and a second governor curve having a second slope, where the second slope is less than the first slope and the second peak torque is less than the first peak torque.

5. The work machine of claim 1, wherein the control system comprises a ground speed load response curve for a given selected range and position of the operator input device, the first and second performance curves both corresponding to the ground speed load response curve.

6. A method for selectively controlling a work machine operating according to a current power device load response, the work machine including a power device having a rotary output, a traction element, a transmission configured to provide a transmission ratio between the power device and traction element, an operator input device having a plurality of positions, and a control system, the method comprising:
receiving selected range and a position of the operator input device;
determining a no-load ground speed target as a function of selected range and input device position;
determining a desired ground speed load response as a function of selected range;
determining a desired transmission ratio as a function of current machine ground speed and machine load;
determining a command to the power device as a function of a current transmission ratio and no-load ground speed target;
determining a desired power device load response as a function of desired transmission ratio and desired ground speed load response; and
selectively controlling the machine by switching between the current power device load response and the desired power device load response.

7. The method of claim 6, further comprising providing a ground speed load response for the selected range and input device position, the ground speed load response being a function of machine load and machine ground speed.

8. The method of claim 7, wherein the determining a no-load ground speed target comprises identifying the machine ground speed from the ground speed load response corresponding to zero machine load.

9. The method of claim 6, wherein the determining desired ground speed load response comprises:
providing a first ground speed load response for the selected range and input device position, the first ground speed load response including a curve with a first slope; and
determining a second ground speed load response including a curve with a second slope, the second slope being less than the first slope;
wherein, the second ground speed load response has a no-load ground speed target equal to or greater than that of the first ground speed load response.

10. The method of claim 6, further comprising determining upshift and downshift shift points in regards to the selected range.

11. The method of claim 10, wherein the upshift and downshift shift points are determined as a function of input device position, machine ground speed, power device speed, rate of change of machine ground speed, rate of change of power device speed, or machine load.

12. The method of claim 10, further comprising shifting between the current transmission ratio and the desired transmission ratio based on the determined upshift and downshift shift points.

13. The method of claim 6, further comprising transitioning from a current power device command to a new power device command.

14. The method of claim 13, further comprising substantially matching the ratio of the power device speed to machine ground speed according to the desired transmission ratio.

15. The method of claim 6, further comprising selecting the power device to operate between a first performance curve and a second performance curve, each of the first and second performance curves expressing torque of the power device as a function of rotational speed of the rotary output of the power device, wherein the first performance curve includes a first no-load speed and the second performance curve includes a second no-load speed, the second no-load speed being equal to or greater than the first no-load speed.

16. The method of claim 15, further comprising:
providing the first performance curve having a first slope and the second performance curve having a second slope, the first performance curve corresponding to a first range selection and the second performance curve corresponding to a second range selection; and achieving two different ground speed load responses for the same transmission ratio.

17. The method of claim 16, further comprising:
providing the first performance curve having a first slope and the second performance curve having a second slope, the first performance curve corresponding to a first transmission ratio and the second performance curve corresponding to a second transmission ratio; and
achieving the substantially same ground speed load response for the first and second transmission ratios.

18. The method of claim 16, further comprising:
selecting the power device to operate according to the second performance curve, where the second performance curve has a maximum torque which is less than a maximum torque of the first performance curve;
limiting tractive effort to avoid wheel slip; and
for a given load, decreasing the power device speed by a greater amount than if the power device were operating according to the first performance curve.

19. A method of determining desired ground speed load response for a work machine having a transmission which provides an arbitrary transmission ratio, a power device having a rotary output, an operator input device, and a control system including power device speed control, the method comprising:
receiving a current input position from a operator input device and range selection from a range selector;
determining a desired no-load ground speed based on the current input position and selected range; and
determining desired ground speed load response based on the selected range;
wherein, the desired no-load ground speed and the desired ground speed load response are independent of the transmission ratio.

20. The method of claim 19, further comprising:
determining a desired no-load power device speed based on the desired no-load ground speed and the arbitrary transmission ratio; and
determining a desired power device load response based on the desired ground speed load response and the arbitrary transmission ratio.

21. The method of claim 20, further comprising determining a power device command based on the desired no-load power device speed, the desired power device load response, and an estimate of load.

22. The method of claim 21, wherein the estimate of load is an estimate of power device torque.

23. The method of claim 21, wherein the estimate of load is an estimate of torque applied by one or more devices operatively coupled with the power device.

24. The method of claim 19, further comprising determining desired power device speed as a function of desired ground speed, the arbitrary transmission ratio, and an estimate of load.

25. The method of claim 18, further comprising substantially nulling the effect of the power device load on power device speed by adjusting the no-load speed command based on an estimate of the power device load response and the estimate of load.

* * * * *